(12) United States Patent
Murphy

(10) Patent No.: US 11,285,511 B2
(45) Date of Patent: Mar. 29, 2022

(54) VIBRATION GENERATING MECHANISM FOR A VIBRATING SCREEN BOX

(71) Applicant: Terex GB Limited, Dungannon (GB)

(72) Inventor: Glenn Murphy, Craigavon (GB)

(73) Assignee: Terex GB Limited, Dungannon (GB)

( * ) Notice: Subject to any disclaimer, the term of this patent is extended or adjusted under 35 U.S.C. 154(b) by 106 days.

(21) Appl. No.: 16/254,332

(22) Filed: Jan. 22, 2019

(65) Prior Publication Data

US 2019/0224720 A1 Jul. 25, 2019

(30) Foreign Application Priority Data

Jan. 23, 2018 (GB) ...................................... 1801108

(51) Int. Cl.
| | | |
|---|---|---|
| *B07B 1/36* | (2006.01) | |
| *B07B 1/28* | (2006.01) | |
| *B06B 1/16* | (2006.01) | |
| *B07B 1/42* | (2006.01) | |
| *F16H 25/14* | (2006.01) | |
| *H02K 7/06* | (2006.01) | |

(52) U.S. Cl.
CPC ................ *B07B 1/284* (2013.01); *B06B 1/16* (2013.01); *B07B 1/36* (2013.01); *B07B 1/42* (2013.01); *F16H 25/14* (2013.01); *H02K 7/061* (2013.01)

(58) Field of Classification Search
CPC .. B07B 1/284; B07B 1/42; B07B 1/36; B07B 1/28; B07B 1/30; B07B 1/34; B07B 1/343; B07B 1/40; B06B 1/16
See application file for complete search history.

(56) References Cited

U.S. PATENT DOCUMENTS

| | | | | | |
|---|---|---|---|---|---|
| 2,062,529 | A | * | 12/1936 | Sahut | ........................ B07B 1/34 209/326 |
| 2,206,386 | A | * | 7/1940 | Bernhard | .............. G01M 5/005 74/61 |
| 3,107,549 | A | | 10/1963 | Matthews | |
| 3,173,300 | A | * | 3/1965 | Loveless | ................. B06B 1/166 74/61 |
| 4,084,445 | A | * | 4/1978 | Erwin | ..................... B06B 1/166 310/115 |
| 4,170,549 | A | * | 10/1979 | Johnson | .................. B06B 1/166 209/363 |

(Continued)

FOREIGN PATENT DOCUMENTS

| | | |
|---|---|---|
| CH | 379867 | 7/1964 |
| CN | 205613700 | 10/2016 |

(Continued)

OTHER PUBLICATIONS

UK Search Report of corresponding UK Application No. GB18101108. 0, dated Jul. 5, 2018.

*Primary Examiner* — Patrick H Mackey
(74) *Attorney, Agent, or Firm* — Gardner, Linn, Burkhart & Ondersma LLP

(57) ABSTRACT

A vibration generating mechanism for a screen box includes a drive shaft arranged to be rotatably driven by a drive motor, at least one first eccentric out-of-balance weight fixed with respect to the drive shaft for rotation therewith and at least one second eccentric out-of-balance weight coupled to the drive shaft via gearing. The first and second out-of-balance weights rotate in opposite directions when driven by the drive shaft.

10 Claims, 3 Drawing Sheets

(56) References Cited

U.S. PATENT DOCUMENTS

| | | | | |
|---|---|---|---|---|
| 4,340,469 | A * | 7/1982 | Archer | B07B 1/284 |
| | | | | 209/315 |
| 5,177,386 | A * | 1/1993 | Shimada | B06B 1/166 |
| | | | | 310/81 |
| 5,896,998 | A | 4/1999 | Bjorklund et al. | |
| 6,830,155 | B2 * | 12/2004 | Trench | B07B 1/284 |
| | | | | 209/680 |
| 9,192,962 | B2 * | 11/2015 | Schmidt | B06B 1/166 |
| 10,046,364 | B2 * | 8/2018 | Ashley | B06B 1/16 |
| 2004/0173040 | A1 * | 9/2004 | Laugwitz | E02D 3/074 |
| | | | | 74/87 |
| 2018/0178252 | A1 * | 6/2018 | Serri | B06B 1/161 |

FOREIGN PATENT DOCUMENTS

| | | |
|---|---|---|
| DE | 19539150 | 3/1996 |
| EP | 1449965 | 5/2004 |
| GB | 2113348 | 8/1983 |
| GB | 2123520 | 2/1984 |
| GB | 2136916 | 9/1984 |

* cited by examiner

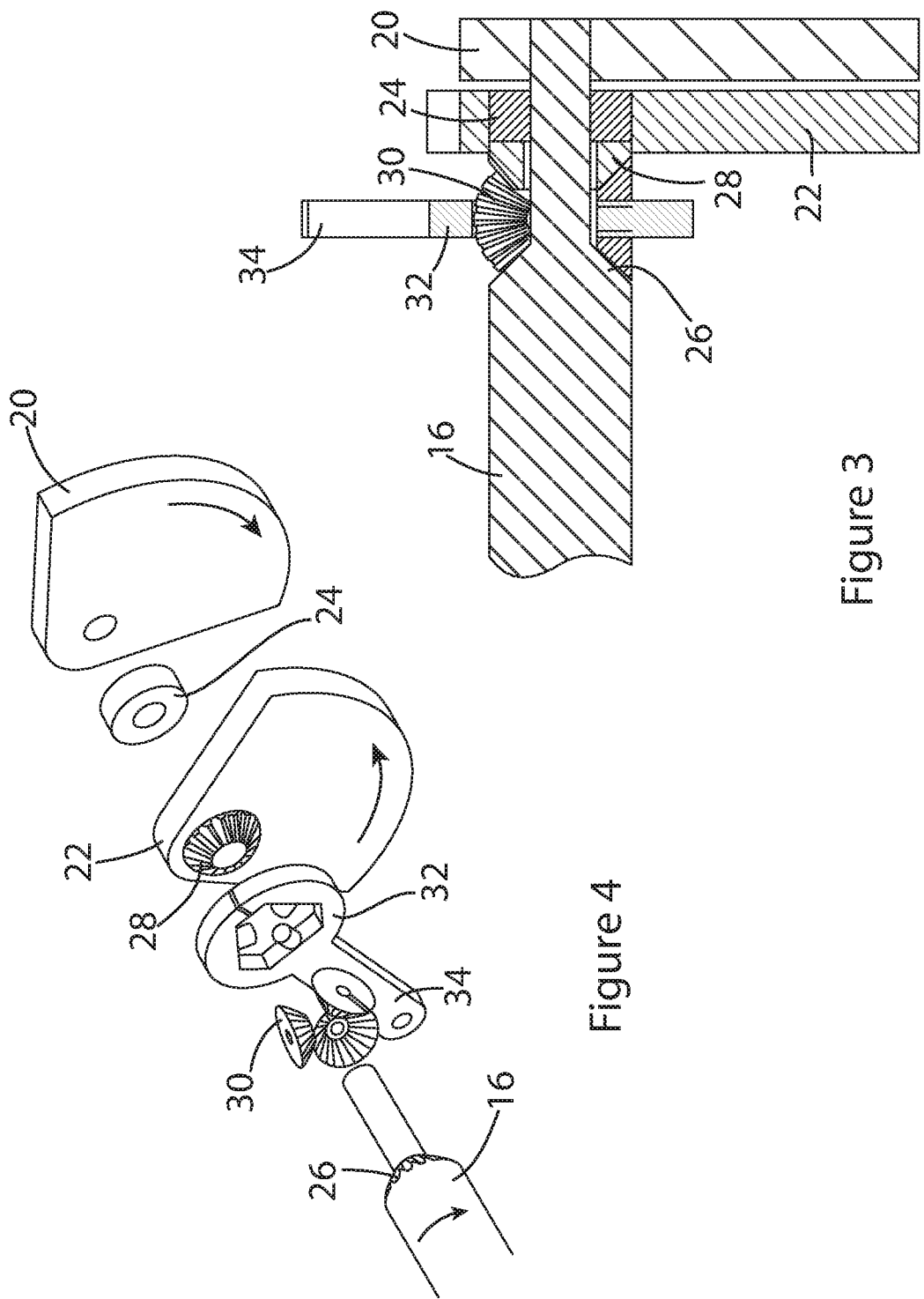

VIBRATION GENERATING MECHANISM FOR A VIBRATING SCREEN BOX

FIELD OF THE INVENTION

The present invention relates to a vibration generating mechanism and, in particular, to a vibration generating mechanism for a vibrating screen box.

BACKGROUND OF THE INVENTION

The aggregate industry utilises many styles of screen machines to sort aggregates by size. Most screen machines utilise vibration to agitate a mixture of aggregates to promote separation through various sized openings in the screening surfaces and/or to reduce the water content of the aggregate material. Sorting is achieved by undersized particles (and water where the screen also serves to dewater) passing through the openings in the screening surface and the oversize particles being retained above the screen surface. These machines usually have some type of vibration generating mechanism to shake the unit and its screening surfaces. The vibration generating mechanism usually comprises one or more unbalanced weights mounted on one or more rotating drive shafts which, when driven by an associated drive motor, force a cyclic motion into the screen machine. The resulting motion can have a circular path, linear path, elliptical path, or any combination of those shapes depending upon the phase relationship between the unbalanced weights of the vibration generating mechanism. The phase relationship is directly related to vibration angle while the speed and the mass of out-of-balanced weights dictate vibration magnitude, and, when counter rotating, determine if resulting vibration is linear or elliptical or other. Equally unbalanced weights counter rotating at the same speed generate a linear vibration. Unevenly unbalanced weights counter rotating at the same speed generate an elliptical vibration. The phase relationship between counter rotating weights dictates the angle of resulting linear/elliptical vibration relative to screen deck, but will not influence maximum resulting vibration magnitude; vibration magnitude will only be influenced by magnitudes of the unbalanced weights and associated rotational velocities. Typical angles of linear/elliptical vibrations are 45-80° relative to a screen deck.

A typical vibrating screen comprises a screen box upon which is mounted a deck, defined by parallel bars or apertured plates, having openings for undersize material to pass through. The screen box is mounted on a chassis or base via resilient mounts and is vibrated at high frequency by the vibration generating mechanism to shake out undersize material and/or excess water through the openings in the deck to be collected in a sump of chute (or further screen) therebelow and to convey oversize material across the deck to one end of the screen box whereby the oversize material is discharged onto a conveyor or into a collection hopper.

The drive shafts of the vibration generating mechanism are typically are mounted in protective and structural cross tubes extending between the sides of the screen box, typically below the deck. The drive shafts are typically mounted side by side in a plane extending transverse to the deck, linked to a common drive motor via a chain, belt or gears. The direction of the vibrational force imparted by the out-of-balance weights is determined by the phase relationship between the weights and determines if resulting vibration is linear or elliptical or other. Whilst variation in the phase difference between the weights can be made with known vibration generating mechanisms, this typically requires dismantling of the vibration generating mechanism.

Due to their location beneath the deck, the cross tubes of the vibration generating mechanism may impede material flow through the deck of the screen box. This may be mitigated by using only a single rotor and cross tube. However, such arrangement is then only capable of generating a circular vibrating motion.

SUMMARY OF THE INVENTION

According to one form of the present invention there is provided a vibration generating mechanism for a screen box including a drive shaft arranged to be rotatably driven by a drive motor, at least one first eccentric out-of-balance weight fixed with respect to the drive shaft for rotation therewith and at least one second eccentric out-of-balance weight coupled to the drive shaft via gearing whereby the first and second out-of-balance weights rotate in opposite directions when driven by the drive shaft.

Optionally, the first and second out-of-balance weights are supported by the drive shaft for rotation about the shaft axis.

In one aspect the gearing includes a drive gear fixed with respect to the drive shaft, a driven gear fixed with respect to the second out-of-balance weight and one or more idler gears transferring drive from the drive gear and driven gear, wherein the drive, driven and one or more idler gears are bevel gears, the one or more idler gears being arranged between and perpendicular to the drive and driven gears. The one or more idler gears may be mounted in a gear carrier. The gear carrier may be mounted such that the angular position of the gear carrier with respect to the axis of the drive shaft can be adjusted to adjust the phase angle between the first and second out-of-balance weights.

The drive shaft may be mounted within a tubular housing adapted to be extend between the side walls of a screen box beneath the deck thereof. A respective pair of first and second out-of-balance weights may be located at each end of the tubular housing on either end of the drive shaft.

The gearing may be adapted to be locked such that the first and second out-of-balance weights rotate in the same direction as the drive shaft. Where the gearing includes a gear carrier supporting idler bevel gears between and perpendicular to a drive bevel gear of the drive shaft and a driven bevel gear of the second out-of-balance weight, the gear carrier may be fixed with respect to the drive shaft to lock the gearing.

According to a further aspect of the present invention there is provided a screening machine incorporating a vibration generating mechanism in accordance with the first aspect of the invention.

In one embodiment the machine includes a screen box adapted to be supported on a base frame by resilient mounts to allow the vibrating screen box to vibrate, the screen box includes a screening deck having openings for undersize material to pass through supported between spaced apart side walls, wherein the drive shaft of the vibration generating mechanism may extend between the side walls, beneath the deck. Optionally, the drive shaft is mounted within a tubular housing extending between the side walls of the screen box. A respective pair of first and second out-of-balance weights may be located at each end the tubular housing on either end of the drive shaft, on the outside of the side walls of the screen box.

These and other objects, advantages and features of the invention will become apparent upon review of the following specification in conjunction with the drawings.

BRIEF DESCRIPTION OF THE DRAWINGS

A vibration generating mechanism for a screen box in accordance with an embodiment of the present invention will now be described, by way of example only, with reference to the accompanying drawings, in which:

FIG. 3 is a detailed sectional view through one end of the vibration generating mechanism of FIG. 1; and FIG. 4 is an exploded view of the mechanism of FIG. 3.

DETAILED DESCRIPTION OF THE DRAWINGS

Figure 1:
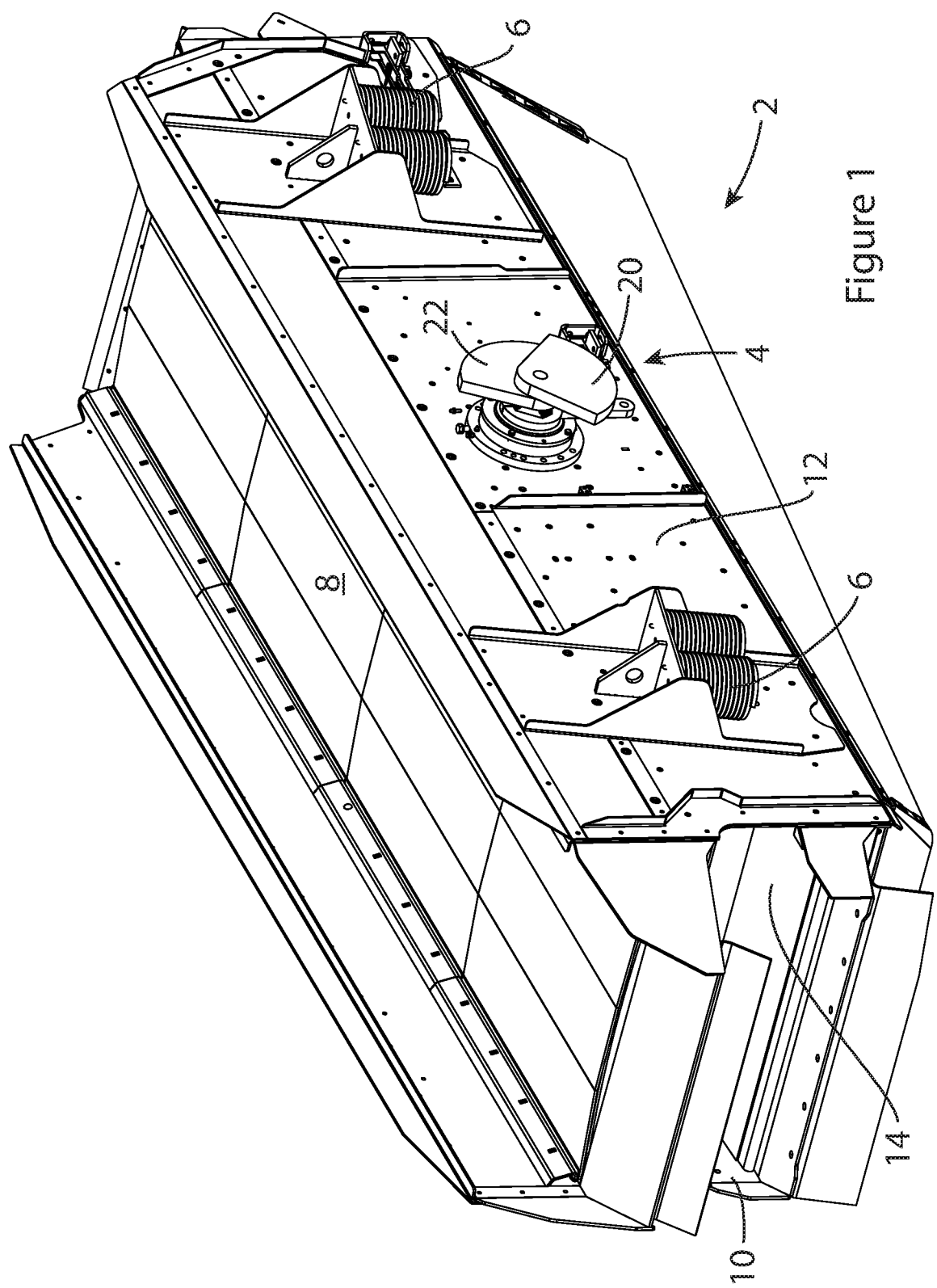
FIG. 1 is a perspective view of a screen box incorporating a vibration generating mechanism in accordance with an embodiment of the present invention.
Figure 2:
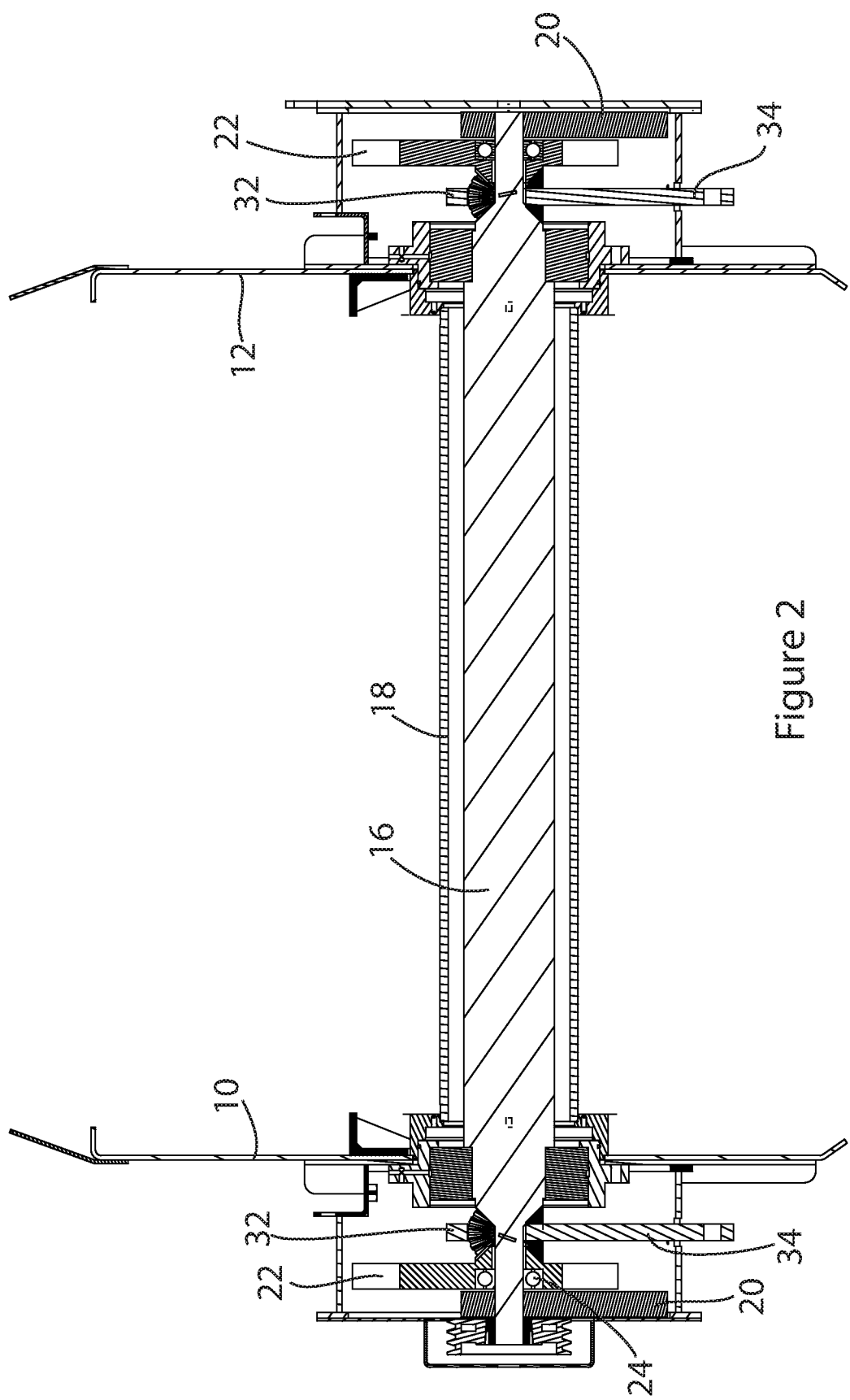
FIG. 2 is a sectional view through the screen box of FIG. 1.

Referring now to the drawings, and more particularly to FIG. 1, there is shown a vibrating screen box 2 incorporating a vibration generating mechanism 4 in accordance with an embodiment of the present invention. The screen box 2 is adapted to be supported on a base frame by springs 6 to allow the vibrating screen box to vibrate, yet isolate the base frame from much of the vibration.

The screen box 2 includes at least one screening deck 8, which may be formed from a plurality of parallel spaced apart bars or rods, or an array of polyurethane panels having a plurality of small slots formed therein, depending upon the nature of the material to be screened and the cut point required. The deck 8 is supported between spaced apart side walls 10, 12 of the screen box joined by transversely extending bridging members (not shown). In the embodiment shown in the drawings, a second deck 14 is mounted below the first deck 8. However, it is envisaged that a sump or collection chute may be provided beneath the first deck 8.

The vibration generating mechanism 4 is mounted on the screen box 2 to extend between the side walls 10, 12 of the screen box, extending transverse to the deck 8. The vibration generating mechanism 4 includes a single drive shaft 16 mounted in a support pipe 18 extending between the side walls 10, 12 of the screen box 2 beneath the deck 8, the drive shaft 16 being driven by a motor (not shown) for rotation about a rotational axis extending transverse to the deck 8.

An eccentrically mounted unbalanced first weight 20 is mounted on each end of the drive shaft on an outer side of each side wall 10, 12 of the screen box 2. A second out-of-balance weight 22 is supported on the shaft 16 coaxially and adjacent each first out-of-balance weight 20, each second out-of-balance weight 22 being supported on a respective bearing 24 on the drive shaft 16 adjacent the respective first out-of-balance weight 20. Each second out-of-balance weight 22 is coupled to the drive shaft via gearing arranged such that each second weight 22 is driven by the shaft 16 to rotate in the opposite direction to the shaft 16 and the first weights 20.

As illustrated in the drawings, each of the first and second out-of-balance weights 20, 22 may include an eccentric flywheel each defining a segment of a disc.

In the embodiment shown in the drawings, the gearing coupling each second weight 22 to the drive shaft 16 includes a set of bevel gears, including a drive gear 26 mounted on or integrally formed on the shaft 16, a driven gear 28 mounted on or integrally formed with the respective second weight 22 and a set of idler gears 30 arranged between and engaged with the drive and driven gears 26, 28, the idler gears 30 each being rotatable about a respective axis perpendicular to the drive and driven gears 26, 28 for transmitting drive between the drive and driven gears 20, 22 while rotating the respective second weight 22 in the opposite direction to the shaft 16. Each set of idler gears 30 is mounted in a respective gear carrier 32 having an operating lever 34 extending radially from the shaft 16.

A drive motor (not shown) may be coupled to the drive shaft 16 via a chain and sprockets, belt and pulleys or gears for driving the drive shaft 16, and hence the out-of-balance weights 20, 22, typically from one end of the drive shaft 16. Optionally, the motor rotates parallel to the axis of the drive shaft 16.

The gear carrier 32 of each set of idler gears 30 is mounted to allow adjustment of the phase relationship between the weights 20, 22 to adjust the direction of the vibrational forces generated by the vibration generating mechanism 4. By adjusting the angular position of the respective gear carrier 32 around the drive shaft axis, by manipulation of its operating lever 34, the phase angle between the respective first and second weights 20, 22 can be altered, allowing real time alteration of the vibration generated by the vibration generating mechanism 4 while the screen is operating. Furthermore, it is possible to operate the vibration generating mechanism 4 with one or both of the gear carriers 32 fixed to drive shaft 16 such that the respective first and second weights 20, 22 rotate together to generate a circular vibration.

Such vibratory motion of the screen box 2 causes the material placed on the deck 8 to be agitated, preventing blocking of the openings in the deck 8 and causing material on the deck to be conveyed towards one end of the screen box 2.

While the invention is described in relation to a vibration generating mechanism for a screen box, it is envisaged that a vibration generating mechanism in accordance with the present invention may be used to generate vibrations in numerous other devices where vibration motion is required.

It will be appreciated that the invention is not limited to the embodiment(s) described herein, but can be amended or modified without departing from the scope of the present invention, which his intended to be limited only by the scope of the appended claims as interpreted according to the principles of patent law including the doctrine of equivalents.

The invention claimed is:

1. A vibration generating mechanism for a screen box, said vibration generating mechanism comprising:
   a rotatable drive shaft;
   at least one first eccentric out-of-balance weight fixed with respect to said drive shaft for rotation therewith; and
   at least one second eccentric out-of-balance weight coupled to said drive shaft via gearing, wherein said first and second out-of-balance weights rotate in opposite directions when driven by said drive shaft;
   wherein said gearing comprises a drive gear fixed with respect to said drive shaft, a driven gear fixed with respect to said at least one second out-of-balance weight, and one or more idler gears transferring drive from said drive gear and said driven gear, wherein said drive gear, said driven gear, and said one or more idler gears comprise bevel gears, said one or more idler gears being arranged between and perpendicular to said drive gear and said driven gear;

wherein said one or more idler gears are mounted in a gear carrier;

wherein said gear carrier is adjustably mounted with respect to said drive shaft such that an angular position of said gear carrier with respect to the axis of said drive shaft is adjustable to adjust a phase angle between said first and second out of balance weights; and wherein said drive shaft is mounted within a tubular housing, with a respective pair of said first and second out-of-balance weights being located at each end of said tubular housing on either end of said drive shaft.

2. The mechanism of claim 1, wherein said first and second out-of-balance weights are supported by said drive shaft for rotation about a shaft axis.

3. The mechanism of claim 1, wherein said gearing may be locked such that said first and second out-of-balance weights rotate in the same direction as said drive shaft.

4. The mechanism of claim 3, wherein said one or more idler gears are mounted in a gear carrier, and wherein said gear carrier may be fixed with respect to said drive shaft to lock said gearing.

5. The mechanism of claim 1, wherein each of said first and second out-of-balance weights comprises an eccentrically mounted flywheel.

6. The mechanism of claim 5, wherein each said flywheel comprises a segment of a disc arranged coaxially with said drive shaft.

7. The mechanism of claim 1, wherein the angular position of said gear carrier with respect to the axis of said drive shaft is adjustable by an operating mechanism.

8. A screening machine comprising:
a screen box;
a vibration generating mechanism for vibrating said screen box, said vibration generating mechanism comprising:
  a rotatable drive shaft;
  at least one first eccentric out-of-balance weight fixed with respect to said drive shaft for rotation therewith; and
  at least one second eccentric out-of-balance weight coupled to said drive shaft via gearing, wherein said first and second out-of-balance weights rotate in opposite directions when driven by said drive shaft;

wherein said gearing comprises a drive gear fixed with respect to said drive shaft, a driven gear fixed with respect to said at least one second out-of-balance weight, and one or more idler gears transferring drive from said drive gear and said driven gear, wherein said drive gear, said driven gear, and said one or more idler gears comprise bevel gears, said one or more idler gears being arranged between and perpendicular to said drive gear and said driven gear;

wherein said one or more idler gears are mounted in a gear carrier;

wherein said gear carrier is adjustably mounted with respect to said drive shaft such that an angular position of said gear carrier with respect to the axis of said drive shaft is adjustable to adjust a phase angle between said first and second out-of-balance weights; and wherein said screen box is adapted to be supported on a base frame by resilient mounts to allow said screen box to vibrate, wherein said screen box comprises a screening deck having openings for undersize material to pass through supported between spaced apart side walls, wherein said drive shaft of said vibration generating mechanism extends between said side walls, beneath said screening deck.

9. The machine of claim 8, wherein said drive shaft is mounted within a tubular housing extending between said side walls of said screen box.

10. The machine of claim 9, wherein a respective pair of said first and second out-of-balance weights is located at each end of said tubular housing on either end of said drive shaft, on the outside of said side walls of said screen box.

* * * * *